United States Patent
Fehr et al.

[19]

[11] Patent Number: 6,031,348
[45] Date of Patent: Feb. 29, 2000

[54] AUTOMATIC AUTOMOTIVE POWER WINDOW SYSTEM AND METHOD OF CONTROLLING AN AUTOMATIC AUTOMOTIVE POWER WINDOW SYSTEM

[75] Inventors: Walton L. Fehr, Mundelein, Ill.; Thomas Schindler, Weitramsdorf; Detlef Russ, Ebersdorf, both of Germany

[73] Assignees: Motorola, Inc., Schaumburg, Ill.; Brose Fahrzeugteile, GmbH & Co., KG, Coburg, Germany

[21] Appl. No.: 09/133,085

[22] Filed: Aug. 12, 1998

[51] Int. Cl.[7] .................................. G05B 5/00; H02P 1/00
[52] U.S. Cl. ........................... 318/283; 318/469; 318/474
[58] Field of Search ............................ 318/562, 452–458, 318/461, 483, 464, 465, 466–470, 280–83, 430, 432, 474; 701/29, 33, 36, 45–49

[56] References Cited

U.S. PATENT DOCUMENTS

| | | | |
|---|---|---|---|
| 4,870,333 | 9/1989 | Itoh et al. ................................. | 318/286 |
| 5,081,586 | 1/1992 | Barthel et al. ............................. | 701/49 |
| 5,488,276 | 1/1996 | Nishibe .................................... | 318/473 |
| 5,585,702 | 12/1996 | Jackson et al. ........................... | 318/266 |
| 5,684,838 | 11/1997 | Kanda et al. ............................. | 375/342 |
| 5,693,993 | 12/1997 | Ito et al. ................................. | 310/68 B |
| 5,832,397 | 11/1998 | Yoshida et al. ........................... | 701/29 |

*Primary Examiner*—Brian Sircus
*Attorney, Agent, or Firm*—Marshall, O'Toole, Gerstein, Murray & Borun

[57] ABSTRACT

An automatic power window system (10) includes a motor module (12) and a controller (14) physically remotely located from the motor module. The motor module and the controller are coupled by a first signal link (16) and a second signal link (18). The first signal link is arranged to carry a limited number of high priority communication data at high speed, while the second signal link is arranged to carry virtually any number of low priority communication data at low speed. The high priority communication data may represent an operating condition of the motor during automatic operation. The operating condition is preferably simply and reliably indicated by the presence, absence or transition of a signal on the first signal link. The low speed communication data represents a plurality of operating data each of which are indicated by a plurality of time-multiplexed signals.

20 Claims, 3 Drawing Sheets

FIG. 3

| FRAME | 1 | 2 | 3 | 4 | 5 | 6 |
|---|---|---|---|---|---|---|
| CONTROLLER | TALKER | TALKER | TALKER | LISTENER | LISTENER | END |
| MOTOR MOD. | LISTENER | LISTENER | LISTENER | TALKER | TALKER | |

| STATE | SIGNAL NAME | INFORMATION FLOW | SIGNAL CHARACTERISTIC |
|---|---|---|---|
| 1 | CONTROLLER SLEP MODE<br>MOTOR MODULE SLEEP MODE | NO COMMUNICATION | |
| 2 | CONTROLLER AWAKE<br>MOTOR MODULE SLEEP/STANDBY | CONTROLLER -> MOTOR MOD.<br>CONTROLLER <- MOTOR MOD. | ~18<br>~16 |
| 3 | CONTROLLER WDO. UP<br>MOTOR MOD. AWAKE<br>HIGH SPEED ACTIVE | CONTROLLER -> MOTOR MOD.<br>CONTROLLER <- MOTOR MOD.<br>CONTROLLER <- MOTOR MOD. | 100<br>~18<br>~16 |
| 4 | CONTROLLER WDO. DWN<br>MOTOR MOD. AWAKE<br>HIGH SPEED ACTIVE | CONTROLLER -> MOTOR MOD.<br>CONTROLLER <- MOTOR MOD.<br>CONTROLLER <- MOTOR MOD. | 100<br>74<br>~18<br>~16 |

| STATE | SIGNAL NAME | INFORMATION FLOW | SIGNAL CHARACTERISTIC |
|---|---|---|---|
| 5 | CONTROLLER WDO. DWN | CONTROLLER -> MOTOR MOD. | ~18 |
|   | MOTOR MOD. AWAKE | CONTROLLER <- MOTOR MOD. | ~16 |
|   | THERMAL PROTECTION ACTIVE | CONTROLLER <- MOTOR MOD. | 40 42 44 46 48 50 52 |
| 6 | CONTROLLER WDO. UP/DOWN | CONTROLLER -> MOTOR MOD. | ~18 |
|   | MOTOR MOD. AWAKE | CONTROLLER <- MOTOR MOD. | ~16 |
|   | MOTOR MOD. NOT INITIALIZED | CONTROLLER <- MOTOR MOD. | 40 42 44 46 48 50 52 |
| 7 | CONTROLLER WDO. UP/DOWN | CONTROLLER -> MOTOR MOD. | ~18 |
|   | MOTOR MOD. AWAKE | CONTROLLER <- MOTOR MOD. | ~16 |
|   | MOTOR MOD. DEFECTIVE OR COMM. ERROR | CONTROLLER <- MOTOR MOD. | 40 42 44 46 48 50 52 |
| 8 | CONTROLLER WDO. UP | CONTROLLER -> MOTOR MOD. | 100, ~74, ~18 |
|   | MOTOR MOD. AWAKE | CONTROLLER <- MOTOR MOD. | ~16 |
|   | OBSTRUCTION DETECTED | CONTROLLER <- MOTOR MOD. | 40 42 44 46 48 50 52 |
| 9 | CONTROLLER WDO. DWN | CONTROLLER -> MOTOR MOD. | ~18 |
|   | MOTOR MOD. AWAKE/ WDO. REVERSING | CONTROLLER <- MOTOR MOD. | ~16 |
|   | POSITION REACHED | CONTROLLER <- MOTOR MOD. | 40 42 44 46 48 50 52 |
| 10 | CONTROLLER WDO. UP/DOWN | CONTROLLER -> MOTOR MOD. | 100, ~18 |
|   | MOTOR MOD. AWAKE | CONTROLLER <- MOTOR MOD. | ~16 |
|   | STALL CONDITION | CONTROLLER <- MOTOR MOD. | 40 42 44 46 48 50 52 |
| 11 | CONTROLLER WDO. DWN | CONTROLLER -> MOTOR MOD. | 100, ~76, ~18 |
|   | MOTOR MOD. AWAKE | CONTROLLER <- MOTOR MOD. | ~16 |
|   | PRESTALL DOWN | CONTROLLER <- MOTOR MOD. | 40 42 44 46 48 50 52 |

AUTOMATIC AUTOMOTIVE POWER WINDOW SYSTEM AND METHOD OF CONTROLLING AN AUTOMATIC AUTOMOTIVE POWER WINDOW SYSTEM

FIELD OF THE INVENTION

The present invention relates generally to automotive power window systems, and particularly, to an automatic automotive power window system.

BACKGROUND OF THE INVENTION

A power window system is a common accessory on a modern automobile. The system employs an electric motor coupled to a window regulator mechanism for opening and closing (e.g., lowering and raising) a window of the vehicle. The motor receives electrical power from the vehicle electrical system, and is coupled to a switch located within the vehicle and convenient to the vehicle operator. The motor is responsive to selective actuation of a switch to either drive the window regulator mechanism to move the window glass from closed positions to open positions and vice-versa. Typically, the vehicle operator presses and holds the switch in one of two positions for moving the window between open and closed positions.

A recent feature that has become common to motor vehicle power window systems is referred to as express or automatic open. In the past the vehicle operator had to press and hold the switch while the motor moved the window to the desired position. An automatic open function moves the window from any position to the full open position responsive to a single press of the switch and without holding the switch.

Still more recently, it has become desirable to provide an express or automatic close feature. This feature allows the window to be moved from any open position to the fully closed position with a single press of the switch and without holding the switch. Several vehicle manufacturers are now offering such a feature.

As will be appreciated, with this added functionality the power window system has become quite complex. Automated open functions must, for example, control the rate at which the window glass descends into the door to prevent damage to the regulator mechanism and to stop the motor when the window glass is in the fully open position. Automated close functions require detection of obstructions that might inhibit fully closing the window and provide an appropriate response. Of course the system must also detect when the window glass is in the fully closed position to stop the motor. Still further, the system must be able to detect failures that may effect system operation and particulary those failures that may effect automatic operation. Fortunately, the ability to provide affordable sophisticated control and diagnosis of the power window system is possible with the use of microprocessors and other associated electronic devices.

It is important to rapidly and reliably detect the operating conditions of the motor and to communicate these conditions to the electronic controller to allow it to quickly and properly control the motor' operation. With this in mind, it has been the practice to associate the control electronics directly with the motor allowing it to directly communicate with the motor using virtually any number of wired connections. This design substantially increases the size of the motor package. A motor including an electronic control module may occupy nearly twice the volume of the motor alone. Since the motor must be positioned in proximity with the window regulator mechanism, e.g., within a door of the motor vehicle, increasing the size of the motor presents problems. There are many competing interests in the design of an automobile. The vehicle stylist seeks visual appeal. The vehicle engineer seeks safety, function and durability. The vehicle marketer seeks ever more features, functions and performance. The vehicle designer is left balancing these competing interests. To provide flexibility to the designer, it is desirable to separate the electronics module from the motor. This allows the designer to position the now smaller motor package in the required position for proper operation of the window regulator mechanism while positioning the electronics at a more convenient location, i.e., where more space is available. Unfortunately, separating the relay device from the motor raises the problem of quickly and reliably communicating operating condition data from the motor to the controller and control signals from the controller to the motor. A parallel data link requires a significant number of wires, requires larger wire connectors, occupies more space and increases cost. A serial data link may not be fast enough or have enough bandwidth without incorporating sophisticated, and expensive, data transmission technology to carry all of the information necessary to ensure proper motor operation.

Thus there is a need for an improved automatic power window system.

BRIEF DESCRIPTION OF THE DRAWINGS

FIG. 3 is a timing diagram illustrating time-multiplexed data communication in accordance with a preferred embodiment of the present invention.

FIG. 4 is a state diagram illustrating several operating states of a power window system in accordance with preferred embodiments of the present invention, the state diagram also including data communication and signal characteristics.

FIG. 5 is a state diagram similar to FIG. 4 and illustrating several additional operating states of a power window system in accordance with preferred embodiments of the present invention, the state diagram also including data communication and signal characteristics.

DETAILED DESCRIPTION OF THE PREFERRED EMBODIMENTS

In accordance with the preferred embodiments of the present invention, an automatic power window system includes a motor and a controller physically remotely located from the motor. The motor and the controller are coupled by a first signal link and a second signal link. Preferably, the first signal link is arranged to carry a limited number of high priority communication data, while the second signal link is arranged to carry virtually any number of low priority communication data. In a particularly preferred embodiment of the present invention, the high priority data represent motor conditions associated with an automatic operating mode as indicated by the presence, absence or transition of a signal. The low speed communication data represents a plurality of operating modes each of which are indicated by one or more of a plurality of time-multiplexed signals.

Figure 1:
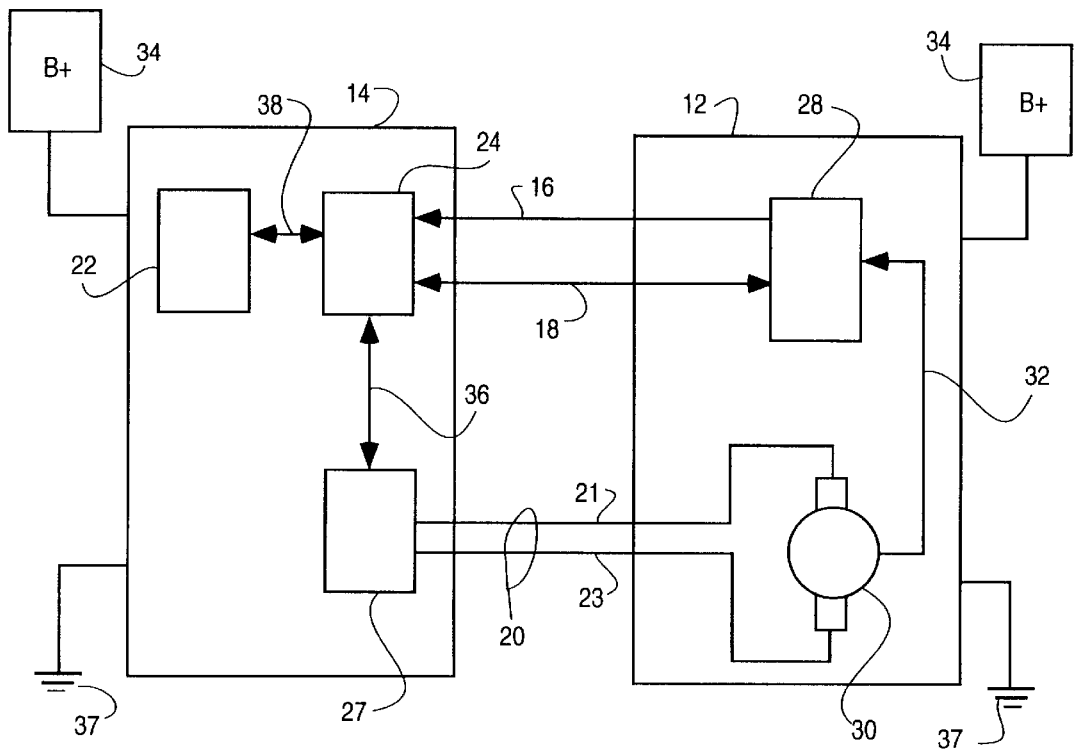
FIG. 1 is a block diagram illustrating an automatic power window system in accordance with a preferred embodiment of the present invention.

With reference then to FIG. 1, an automatic power window system 10 includes a motor module 12 and a controller 14. In application, controller 14 may be physically remotely located from motor module 12. For example, motor module 12 is positioned so that motor 30 is operatively, mechanically coupled to a window regulator mechanism (not shown) for moving the window glass between an open position and a closed position. Controller 14 may be located elsewhere within the door assembly or even within the vehicle as space constraints require. Motor module 12 and controller 14 are coupled by a first signal link 16, a second signal link 18 and by a power signal link 20. Power signal link 20 is coupled within controller 14 to a power switch 26 for selectively providing electrical power to motor module 12 for energizing motor 30 and to thereby provide driving torque to the window regulator mechanism for opening and closing the window glass.

Motor module 12 includes in addition to motor 30 a motor processor 28. First signal link 16 and second signal link 18 couple to motor processor 28 for data communication between motor module 12 and controller 14 as will be described. As is known in the art, motor 30 includes a sensing circuit or circuits (not shown) providing signals to motor processor 28 indicative of motor operation. The signals are communicated via signal link 32 from motor 30 to motor processor 28. The sensing circuit is typically operative to detect the impending stall of motor 30, for example, when the window regulator mechanism reaches its fully open position or when an object inhibits window travel to a fully closed position. Motor modules incorporating the above described features are readily, commercially available. Motor module 12 may further be coupled to a dc voltage supply 34, i.e., the vehicle electrical system, and to ground 37, as required for proper operation.

Controller 14 is coupled to dc voltage supply 34 and to ground 37 and includes a controller processor 24 which is coupled to logic 22 and to power switch 26. Power switch 26 is preferably an H-bridge configured switch circuit for coupling electric power, i.e., dc voltage, via power signal link 20 to motor 30 in a first sense for driving motor 30 in a first direction and in a second sense for driving motor 30 in a second direction. Power switch 26 is also operable for decoupling electric power from motor 30 during motor idle periods. Power switch 26 is coupled via signal link 36 to controller processor 24 for receiving switch control signals therefrom as is very well known in the art. Responsive to the control signals, power switch 26 couples electric power in the appropriate sense to motor 30 via first power conductor 21 and second power conductor 23. Logic 22 is coupled via link 38 to controller processor 24 and contains operating instructions utilized by controller processor 24 during operation of system 10.

In a preferred embodiment of the present invention, first signal link 16 communicates high priority data while second signal link 18 communicates low priority data. That is, during operation of system 10, numerous pieces of data are exchanged between controller 14 and motor module 12. For example, controller 14 provides data to motor module 12 regarding system initialization, direction of motor travel, and the like. Motor module 12 provides data to controller 14 regarding the thermal status of motor 30, initialization of motor module 12, existence of a fault condition and motor stall condition. During operation, much of this data may be communicated at a relatively slow speed, e.g., over a period of about 100 milliseconds (ms). However, other data, and particularly obstruction detection, must be quickly and reliably communicated to controller 14, e.g., in less than about 1–2 ms. For example, during window closing an indication that an object may be inhibiting the free travel of the window glass to the closed position must be quickly detected. This information must be quickly communicated to controller 14 so that controller 14 may take appropriate action such as reversing the operation of motor 30 to return the window glass to a predetermined open position.

Providing a communication link, such as a parallel wire connection, a high speed serial data connection and the like to ensure that the high priority data, along with all of the other operating data, is communicated quickly enough to ensure proper system operation is inefficient. Only a relatively few pieces of data require high speed communication while the remainder of the data may be communicated at much slower rates without effecting system operation. Therefore, in accordance with the preferred embodiments of the present invention, first signal link 16 is arranged to communicate at high speed the time critical pieces of operation data while second signal link 18 is arranged to communicate the remaining, less critical, pieces of operation data at lower speeds. Thus the present invention greatly simplifies and economically, efficiently and reliably provides for communicating the operating data at the appropriate rates of communication to ensure proper system operation.

In a preferred embodiment of the present invention, first signal link 16 is arranged to provide only three pieces of information indicated by the presence, absence or transition of a signal generated within motor module 12 and communicated to controller 14. Presence of the signal on signal link 16 is an indication that automatic system operation is allowed. Absence of the signal on signal link 16 is an indication that automatic system operation is not allowed. During automatic motor operation, transition from the signal being present to the signal being absent is an indication that the motor should be stopped. Controller 14 further has information regarding the direction of motor travel. Thus, encountering a transition during automatic window closing will indicate a need to return the window glass to the predetermined open position. A transition during automatic window opening indicates that a stopping procedure should be implemented.

Figure 2:
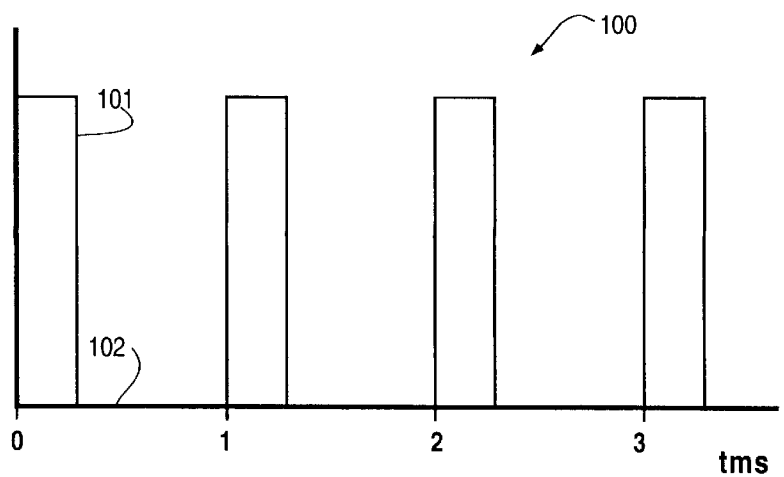
FIG. 2 is a timing diagram illustrating a data signal in accordance with a preferred embodiment of the present invention.

Referring to FIG. 2, the signal 100 is preferably an about 1 kiloHertz (kHz) square wave signal having a duty cycle of about 10% to 50%, with a 20% duty cycle being preferred. Signal 100 is also preferably an actively generated square wave signal generated by motor module 12 and communicated on first signal link 16 to controller 14. Signal 100 is also preferably an asymmetric signal and its form includes a short "high" or "off" period 101 and a longer duration "low" or "on" period 102 consistent with a "low" side control strategy. The asymmetric form of signal 100 enhances its immunity to noise that may be present within the motor vehicle environment. Operating at 1 kHz, controller processor 24 may detect a transition, indicating a need to stop motor operation, within about 1 ms. Of course the frequency of signal 100 may be selected, either higher or lower, as the detection requirement of the system dictates.

Motor processor 28 is arranged to include a signal generator for generating signal 100 and controller processor 24 is arranged with a signal detector for detecting the presence or absence of the signal on first signal link 16. In this regard, first signal link 16 may be considered a uni-direction communication link since communication, transmission of signal 100, occurs in a single direction. Preferably the first signal link 16 is passively held high within controller processor 24. Motor processor 28 actively pulls first signal link 16 low for generating signal 100. Arranging motor processor 28 and controller processor 24 to operate in this manner is well within the skill of one having ordinary skill in the art.

Second signal link 18 is arranged to communicate the remaining of the operating data at a much lower communication rate. Preferably, a time division multiplex scheme is used to allow both controller 14 and motor module 12 to communicate with the other in a bidirectional manner. Referring to FIG. 3, an exemplary timing diagram illustrates six time slots respectively numbered 40, 42, 44, 46, 48 and 50. A master slave relationship is established with controller 14 acting as the master and motor module 12 acting as the slave. Each of the first five time slots, 40–48, are dedicated to communicating data between controller 14 and motor module 12, and the sixth time slot 50 is a sync time slot. In the preferred embodiment shown, each time slot or "frame" is 16 milliseconds in duration and a total cycle is repeated every 96 milliseconds. In the first three time slots, 40–44 respectively, controller 14 provides data, i.e., is the "talker," and motor module 12 receives data, i.e., is the "listener." In the fourth and fifth time slots, 46 and 48, respectively, motor module 12 is the talker and controller 14 is the listener. As noted, the sixth time slot 50 is a sync time slot. Similar to first signal link 16, second signal link 18 is preferably passively held high within controller processor 24. However, each of controller 14 and motor module 12 are arranged to pull second signal link 18 low in the appropriate time slot for communicating data therebetween. A low transition is provided at the end of each cycle, i.e., in the sixth frame, for synchronization. Also observed in the drawings by the offset alignment of the talking frame and the listening frame, is that the communication signal need not precisely align with the frame boundaries. Instead, each of controller processor 24 and motor processor 28 are operable to detect the signal, and hence the data, occurring during a defined time frame.

With reference then to FIG. 4 and FIG. 5, operation of system 10 is described in more detail. FIG. 4 and FIG. 5, illustrate a number of operating states, respectively numbered 52–72. With respect to each state shown in FIG. 4 and FIG. 5 the signal communicated, the direction of the flow of information, and an illustration of the signal characteristic for the signals on each of first signal link 16 and second signal link 18 is shown. Beginning then with FIG. 4, in the first state 52, both controller 14 and motor module 12 are idle, or asleep. As a result there is no communication therebetween.

In the second state 54, a low transition in first frame 40 indicates controller 14 is awake while the motor module 12 is still asleep or in a standby mode. First signal link 16 is therefore passively held high by controller 14.

In the third state 56, a low in both first frame 40 and second frame 42 is an indication that controller 14 is awake and that the direction for motor 30 is to close the window. Motor module 12 is awake, and signal 100 is present in first signal link 16. Thus, automated window closing is allowed. The fourth state 58 is similar. However, a low in both the second frame and the third frame indicate that the motor direction is open. Again, the presence of signal 100 on first signal link 16 is an indication that automated operation is allowed.

In each of the fifth state 60, the sixth state 62 and the seventh state 64 automated operation of system 10 is not allowed. This information is immediately available to controller 14 from the absence of signal 100 on first signal link 16. In the fifth state 60, controller 14 is awake as indicated by the low in the first frame and the motor direction may be either open or close. Motor module 12 communicates a low signal in the fifth frame in conjunction with the absence of signal 100 on first signal link 16, i.e., first signal link being held high, providing an indication of a fault condition with motor 30. A fault type may include a thermal protection fault or other similar fault within motor 30. The sixth state 62 shows that motor module 12 is not initialized which is indicated by a low signal in both the fourth frame and the absence of signal 100 on first signal link 16. The seventh state 64 illustrates a defective motor module 12 and/or a communication failure. Signal 100 is absent from first signal link 16, which may be either held low or held high, and each of the fourth frame and the fifth frame is high indicating a failure of motor module 12 to communicate to controller 14.

Referring now to FIG. 5, in the eighth state 66, the system is operating in an automatic window close mode. A transition 74 is detected on first signal link 16 from the presence of signal 100 to the absence of signal 100 with first signal link 16 finally being held low. Transition 74 indicates that an object may potentially be blocking the free travel of the window glass to the closed position. Controller 14 is operable upon the occurrence of transition 74, with knowledge that motor 30 was operating in the close direction, to reverse the direction of motor 30 and to return the widow glass to a predetermined position. In the ninth state 68, a low signal in the third frame indicates that controller 14 has arranged motor 30 to operate in the open direction. With first signal link 16 held low, a low signal from motor 30 in the fourth frame provides an indiction that the predetermined position has been reached and power may be decoupled from motor 30.

In the tenth state 70, the window is operating in the close direction, i.e., a low signal in the second frame, and signal 100 present on first signal link 16, a stall associated with the fully close position is indicated by motor module 12 by communicating a low signal in the fifth frame. In the eleventh state 72, with motor 30 operating in the open direction, i.e., a low signal in the third frame, a transition 76 is detected. Transition 76 is an indiction that window glass is reaching its fully open position and that a stopping procedure should be initiated to prevent damage to the window regulator mechanism.

As will be appreciated from the foregoing, permitting automatic operation or inhibiting automatic operation of system 10 is indicated, respectively, by the presence or absence of signal 100 on first signal link 16. In addition, various communications between motor module 12 and controller 14 provide an indication as to the possible fault with motor 30 and/or system 10 generally. Transition 74 associated with automatic close operation of system 10 indicates a condition for which motor 30 is reversed to move the window glass to a predetermined position. Transition 76 associated with automatic open operation of system 10 indicates the full open position is nearly reached and that a stopping procedure should be initiated.

Many additional changes and modifications could be made to the invention without departing from the fair scope and spirit thereof. The scope of some changes is discussed above. The scope of others will become apparent from the appended claims.

We claim:

1. An automotive power window system comprising:
  a motor arranged for mechanically actuating a window regulator mechanism for moving a window glass between an open position and a closed position;

a first signal link and a second signal link each coupling the motor to a controller, the controller being physically remotely located from the motor;

the first signal link arranged for communicating a high priority data at a high data rate, the high priority data being associated with motor operation in an automatic operating mode; and the second signal link arranged for simultaneously with communication of the high priority data on the first signal link communicating a low priority data at a low data rate, the low priority data being associated with operating commands for the motor.

2. The power window system of claim 1, wherein the high priority data is indicated by at least one of a presence, an absence and a transition of a signal on the first signal link.

3. The power window system of claim 2, wherein the signal comprises an actively generated square wave signal.

4. The power window system of claim 2, wherein the signal is an asymmetric signal.

5. The power window system of claim 2, wherein the signal has a duty cycle between 0% and 50%.

6. The power window system of claim 2, wherein the motor comprises a motor processor and the signal is actively generated by the motor processor in the automatic operating mode.

7. The power window system of claim 2, wherein the absence is an indication that automatic operation is not allowed.

8. The power window system of claim 2, wherein the transition is an indication to stop operation of the motor.

9. The power window system of claim 1, wherein the low priority data represent at least one data of the group of data comprising system wake up, motor operation open, motor operation closed, motor thermal condition, window closed and window position reset.

10. A system for automatic actuation of a window regulator within a motor vehicle comprising:

a motor operatively coupled to the window regulator for providing driving torque thereto;

a controller physically remotely located from the motor;

a first signal link coupling the motor to the controller, a second signal link coupling the motor to the controller and a power signal link coupling the motor to the controller each of the first signal link, the second signal link and the power signal link comprising a separate physical connection;

the motor including a signal generator for generating a high priority data signal on the first signal link at a high data rate;

the second signal link arranged for communicating a low priority data signal at a low data rate, the low priority data being associated with operating commands for the motor; and the controller including a signal detector for detecting a presence of the signal on the first signal link, the controller being responsive to the presence for coupling electrical power to the motor over the power signal link for automatic operation.

11. The system of claim 10, an absence of the signal indicative that automatic operation is not allowed.

12. The system of claim 10, a transition of the signal indicative that motor operation should be stopped.

13. The system of claim 10, the signal comprising an actively generated square wave signal.

14. The system of claim 10, the signal comprising an asymmetric signal.

15. The system of claim 10, the signal having a duty cycle of about 20%.

16. A method of automatically operating a power window system in a motor vehicle, the power window system including a window regulator arranged for opening and closing a window glass, a motor coupled to the window regulator for providing driving torque thereto, a controller physically remotely located from the motor, a first signal link coupling the motor and the controller, a second signal link coupling the motor and the controller and a power signal link coupling the motor and the controller, the method comprising the steps of:

detecting one of a presence, an absence and a transition of a signal on the first signal link; and responsive to one of the presence, the absence and the transition of the signal, selectively permitting automatic operation.

17. The method of claim 16, comprising upon detecting the presence of the signal, permitting automatic operation.

18. The method of claim 16, comprising upon detecting the absence of the signal inhibiting automatic operation.

19. The method of claim 16, comprising upon detecting the transition stopping motor operation.

20. The method of claim 19, further comprising upon detecting the transition during an automatic close, returning the window glass to a predetermined position.

* * * * *